United States Patent Office 3,515,443
Patented June 2, 1970

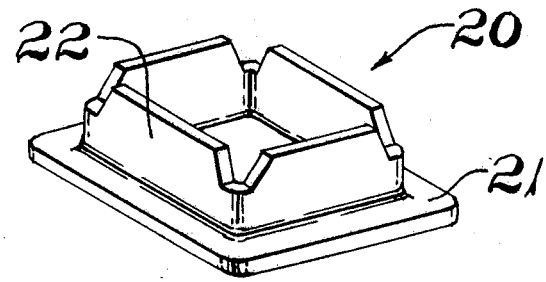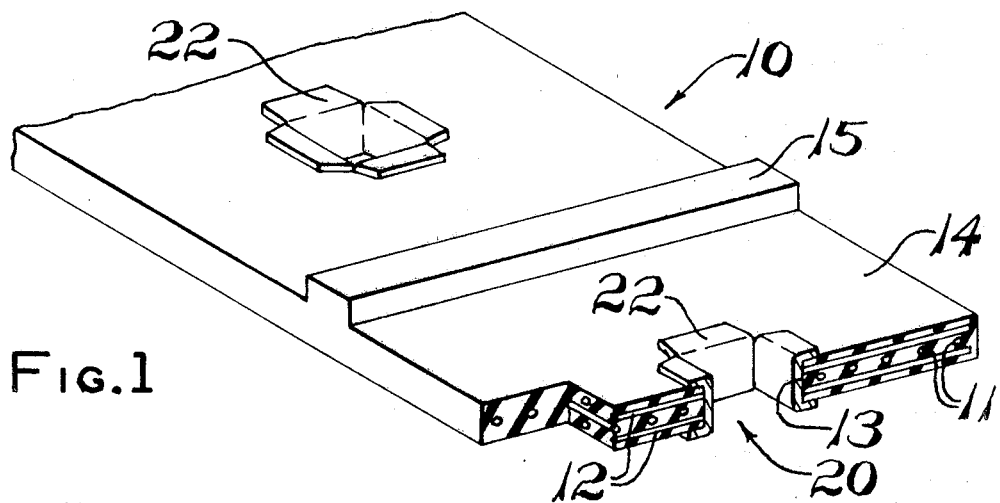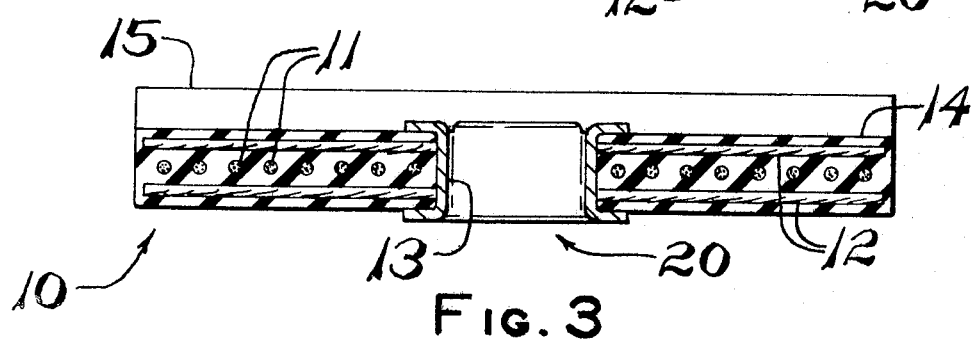

1

3,515,443
TRACTION BELT
Allan D. Hallaman, Akron, Ohio, assignor to The B. F. Goodrich Company, New York, N.Y., a corporation of New York
Filed June 13, 1968, Ser. No. 736,834
Int. Cl. B62d 55/24
U.S. Cl. 305—38                                    6 Claims

ABSTRACT OF THE DISCLOSURE

An elastomeric traction belt having spaced traction lugs disposed on the traction surface and a central layer of tension resistant cords with a layer of transverse metal cords disposed on both sides of the tension cords. The belt has spaced apertures lined with metal reinforcing clips extending through the apertures to either side of the belt for contacting the teeth of a driving sprocket.

BACKGROUND OF THE INVENTION

Flexible elastomeric traction belts are often used for propelling vehicles of the type used for traversing uneven terrain and on vehicles of the type known as snowmobiles. Vehicles of this type are usually supported partially by a suspension with rollers connected to the suspension and having a driving continuous traction belt running thereover and further supported by steerable runners or skis. The traction belt commonly is driven by engaging a toothed sprocket which receives driving power from a rotating shaft connected to an engine.

The traction belt for a vehicle of the abovementioned types, particularly snowmobiles, necessarily must be quite flexible longitudinally yet stiff in the transverse direction. This longitudinal flexibility and transverse stiffness is most necessary where traction belt speeds are relatively high in order to provide compliance with uneven terrain and yet permit the belt to track properly without "wandering" or becoming disengaged while running over the driving sprockets and rollers.

It is well known in the art to provide transverse stiffness in elastomeric belts by incorporating woven fabric reinforcement. Fabric reinforcement has, however, the disadvantage of concurrently increasing the longitudinal stiffness of the belt in addition to providing the desired increase in tranverse stiffness. For this reason woven fabric has been found unsatisfactory as a reinforcement for traction belts of the present type where longitudinal flexibility is of prime importance.

Furthermore, where elastomeric belts are used for propelling vehicles of the above-mentioned type by means of sprocket teeth engaging spaced apertures or holes in the belt, deformation and excessive wear of the sides of the sprocket engaging holes is often experienced under the pressure of sprocket tooth contact. Furthermore, excessive chafing of the sides of the sprocket teeth may occur due to rubbing contact of the sprocket teeth with the exposed ends of the transverse stiffening members extending into the apertures. Deformation or excessive wear of the sprocket engaging holes can produce improper tracking or "wandering" of the traction belt and ultimately disengagement of the sprocket teeth from the belt.

SUMMARY OF THE INVENTION

The invention disclosed and claimed herein relates to a traction belt having a unique structure which provides a solution to the aforementioned problems of providing transverse stiffness to the belt and providing reinforcement against deformation and wear of the edges of the sprocket engaging holes when the belt is used for vehicles of the type known as snowmobiles. The invention also provides protection of the sides of the sprocket teeth from chafing with the exposed ends of transverse stiffening members in the belt.

The traction belt of the present invention derives its transverse stiffness from parallel flexible stranded metal cords extending transversely of the belt in parallel layers. At least one layer of transverse cords is disposed on each of the opposite sides of the central tension cords spaced closely adjacent the faces of the belt. The flexible transverse cords are arranged in pairs with the cords in each pair disposed on opposite sides of the central tension layer and located at the same longitudinal station along the length of the belt. The flexible transverse cords in spaced pairs stiffen the belt transversely, yet being independent of the central tension members, the transverse cords cause only a negligible increase in the longitudinal stiffness of the belt. Furthermore, the flexible nature of the transverse cords provides resilience to the belt surfaces wherein local deflection is permitted upon impact with hard objects, yet distortion of the belt cross section is prevented by the stiffening effect of the two spaced layers of transverse cords.

The invention provides reinforcement in each of the sprocket-engaging apertures by means of a metal clip inserted in each of the apertures and extending through the thickness of the belt. Preferably, the clip is tubular with the walls thereof generally conforming to the shape of the tooth-receiving aperture and contacting all sides of the aperture around the periphery thereof in closely fitting arrangement. The metal clips thereby provide a liner for the side surfaces of each of the apertures such that the contacting pressure and abrasion of alternate engagement and disengagement with sprocket teeth is absorbed by the metal clip. Moreover, the sides of the sprocket teeth engaging in the apertures are protected from rapid wear. In the preferred form of the clips each has a flange on one end extending outwardly at a right angle to the tubular portion. This flange rests against one face of the belt. The opposite end of the clip is flared outwardly over the opposite face of the belt to reinforce the margins of the sprocket teeth apertures in the belt thereby preventing withdrawal of the clip from those apertures.

BRIEF DESCRIPTION OF THE DRAWINGS

FIG. 1 is a perspective view of a portion of the belt with a part of one edge broken away to show the cord structure and a typical sprocket engaging clip;

FIG. 2 is a perspective view of one of the flanged sprocket engaging clips as it appears prior to installation on the belt; and FIG. 3 is a transverse sectional view of the belt showing in detail the installation of the sprocket engaging clip.

DETAILED DESCRIPTION

Referring to FIG. 1, the preferred form of the belt 10 is shown with one end broken away to expose the reinforcing cord structure and one of a plurality of spaced sprocket-receiving apertures. The belt is of elastomeric material with an elongated generally rectangular cross section and two opposite generally parallel inner and outer faces. The belt 10 has a central tension-resistant layer of inextensible cords 11 disposed in equally spaced parallel arrangement with each cord extending longitudinally continuously through the belt. In the preferred form of the invention, the cords 11 are non-metallic and but one layer of cords 11 is employed. However, additional layers of cords 11 may be added where required for strength and/or the cords 11 may be metallic. At least one layer of stranded metal cords 12 is disposed on each of the opposite sides of the central layer of tension cords 11, with the stranded metal cords 12 extending transversely at substantially right angles to the belt length, with the cords in each layer in equally spaced mutually parallel arrangement. The transverse cords 12 in each layer are arranged in pairs lying in a plane perpendicular to the tension cords 11, such that a cord 12 in one layer has the same longitudinal station as another cord 12 in the layer on the opposite side of the tension cords 11. Each layer of stranded metal transverse cords 12 is spaced closely adjacent the surface of the belt for providing local reinforcement for the belt surfaces. Together the layers of transverse cords on opposite sides of the tension cords provide transverse stiffness to the belt carcass. The belt is made of endless construction in the preferred form of the invention but may alternatively be made by joining the ends of a strip in a coupling.

The belt 10 has a plurality of substantially rectangular sprocket-receiving apertures 13 extending through the thickness of the belt and disposed in longitudinally equally spaced linear arrangement. The spacing of the apertures is chosen such as to provide the capability for interengagement with the teeth of a desired sprocket. In the preferred form of the belt, the sprocket-receiving apertures 13 are formed as squares each having a side length of one inch for a belt having a width of 15–22 inches and a thickness of $9/32$–$3/8$ inch. However, the dimensions of the apertures 13 may be chosen to suit the particular sprocket teeth with which the belt is to be driven.

The belt 10 has an outer traction surface 14 having a plurality of transversely extending traction lugs 15 projecting outwardly therefrom. The lugs 15 are in longitudinally equally spaced parallel arrangement intermediate the sprocket-receiving apertures 13 to provide necessary traction for the belt when it is mounted in driving position on a vehicle. The diameter of the cords 12 and longitudinal spacing in the belt may be selected in accordance with the dimensions and desired strength of the belt.

In the preferred form of the present invention, the transverse metal cords 12 are formed of a plurality of metallic filaments with the diameter of the cords in the range of 0.050 to 0.020 inch for the above-mentioned sizes of belts. The transverse cords 12 are preferably equally spaced longitudinally with 4 to 14 transverse cords per inch of belt length.

Referring now to FIG. 2, a tubular metal clip 20 is shown, which is adapted to interfit each of the apertures 13 in the belt 10. The clip 20 has a wall thin in proportion to its transverse section, the latter being polygonal matching the shape of the apertures. One end of the clip is flared outwardly at right angles to the central portion to provide an integral flange 21. The opposite end of the clip is notched or slit axially to form a plurality of integral tabs 22 adapted to be flared outwardly. Referring to FIGS. 1 and 3, the clip is shown installed in one of the apertures 13. In the installed position, the flange 21 contacts the inner surface of the belt with the clip central portion lining the aperture 13. The tabs 22 on the free end are flared outwardly over the outer surface 14 of the belt thereby providing retaining flanges for securing the clip from withdrawal from the aperture as well as reinforcing the margins thereof.

The invention thus provides a unique elastomeric traction belt having a high degree of longitudinal flexibility with improved lateral and transverse rigidity by virtue of at least two layers of spaced transversely extending flexible metallic cords. The belt has sprocket-engaging holes or apertures reinforced with metal clips to provide rigid surfaces for contacting the teeth of a driving sprocket thus preventing excessive wear and deformation of the sprocket-receiving holes. The ends of exposed belt stiffening wires are also covered to protect the sprocket teeth from rapid wear and damage from the wires.

The invention has been illustrated with the flanges of the aperture clips substantially planar, but the invention is not limited to this configuration. The flanges of the clips may also be curved to conform to the radius of the sprocket over which the belt is to run.

Moreover, while the clips have been shown as formed from seamless metal tubing rectangular in cross section, they may be formed from flat sheet stock if desired. The sprocket hole reinforcements can also be used with belts of other constructions. These and other modifications and adaptations may be made by those having ordinary skill in the art without exceeding the ambit of the invention which is limited only by the spirit and scope of the appended claims.

I claim:
1. An elastomeric vehicular traction belt comprising:
 (a) a body of elastomeric material having a generally rectangular transverse cross section with opposite generally parallel inner and outer faces with the outer face having a plurality of traction-increasing portions thereon;
 (b) a plurality of tension members embedded in said body extending longitudinally in at least one planar layer;
 (c) a plurality of transverse stiffening members embedded in said body at substantially right angles to said tension members, said transverse members being of flexible inextensible stranded metal material in at least two continuous spaced parallel layers one on each opposite side of said tension members with the said transverse members being respectively spaced closely adjacent the said inner and outer surfaces of said body;
 (d) the said body having a plurality of uniformly spaced sprocket teeth receiving apertures intermediate its longitudinal edges;
 (e) a metal reinforcement for the surfaces of each of said apertures, which reinforcements each comprise portions overlaying the margins of the apertures on each face of the belt and interconnected portions extending through the aperture and covering the entire inner periphery thereof.

2. The belt as defined in claim 1, wherein said tension members comprise a single layer of cords of inextensible material.

3. The belt defined in claim 1, wherein the reinforcement for each aperture is a unitary sheet metal member with the said portions extending over the margins of the apertures formed as flanges extending generally at right angles to the portions extending through the apertures.

4. The belt as defined in claim 1, wherein said transverse members are wire cords each comprising a plurality of filaments with cords spaced 4–14 cords per inch of belt length and with the cords having a diameter in the range 0.050–0.020 inch.

5. The belt defined in claim 1, wherein said apertures are substantially rectangular in shape and said reinforcements have the portions extending through the apertures complementary in shape to said apertures.

6. The belt defined in claim 1, wherein:
 (a) said body is of endless construction,
 (b) said tension members extend continuously in spaced parallel relationship,
 (c) said clips are formed of tubular material having a rectangular cross-section with an integral flange formed outwardly on one longitudinal edge thereof with the underside of said flange contacting the surface of said belt, the clip extending through said aperture beyond the opposite surface of said belt and the end of said tube is flared outwardly for retaining said clip in said aperture.

References Cited
UNITED STATES PATENTS

| | | | |
|---|---|---|---|
| 3,105,536 | 10/1963 | Cappa | 305—35 X |
| 1,202,682 | 10/1916 | Diehl | 74—231 |
| 2,461,849 | 2/1949 | Slemmons | 305—38 |
| 2,476,828 | 7/1949 | Skromme | 305—38 |
| 2,793,150 | 5/1957 | Deaves | 74—237 X |
| 3,120,409 | 2/1964 | Beall | 305—38 X |
| 3,144,930 | 8/1964 | Michels | 198—193 |
| 3,285,677 | 11/1966 | Marier | 305—38 |

FOREIGN PATENTS

| | | |
|---|---|---|
| 678,766 | 1/1964 | Canada. |
| 102,091 | 11/1916 | Great Britain. |

OTHER REFERENCES

Edward B. Stimpson Co., Catalog No. 86, p. 4, published 1939, Brooklyn, N.Y.

RICHARD J. JOHNSON, Primary Examiner

U.S. Cl. X.R.

74—237; 198—184